United States Patent [19]

Wolowski et al.

[11] Patent Number: 4,696,735
[45] Date of Patent: Sep. 29, 1987

[54] METHOD AND APPARATUS FOR MULTIPHASE COAL HYDROGENATION REACTORS WITH EXOTHERMAL HEAT OF REACTION HAVING GAS COOLING IN SUMP-PHASE REACTORS

[75] Inventors: Eckard Wolowski, Mülheim; Frank Mirtsch, Bottrop; Herbert Dybus, Essen, all of Fed. Rep. of Germany

[73] Assignee: Ruhrkohle Aktiengesellschaft, Essen, Fed. Rep. of Germany

[21] Appl. No.: 789,799

[22] Filed: Oct. 21, 1985

[30] Foreign Application Priority Data

Oct. 20, 1984 [DE] Fed. Rep. of Germany ....... 3438606

[51] Int. Cl.$^4$ .......................... C10G 1/00; B01J 10/00
[52] U.S. Cl. .................... 208/408; 208/412; 208/159; 208/142; 422/203; 422/205
[58] Field of Search ............. 208/107, 49, 59, 142, 208/159, 412, 408, 159; 165/134 R; 422/181, 198, 202, 203, 204, 205, 234, 239

[56] References Cited

U.S. PATENT DOCUMENTS

| 3,030,193 | 4/1962 | Marullo et al. | 422/205 |
| 3,186,935 | 6/1965 | Vaell | 208/59 |
| 3,477,828 | 11/1969 | Schulze et al. | 422/203 X |
| 3,807,963 | 4/1974 | Smith | 423/203 X |
| 3,862,108 | 1/1975 | Layng | 208/108 |
| 3,884,649 | 5/1975 | Matthews | 48/202 |
| 3,926,775 | 12/1975 | Schroeder | 208/10 |
| 3,950,244 | 4/1976 | Chun et al. | 208/143 |
| 3,953,180 | 4/1976 | Hoffert et al. | 48/215 |
| 4,021,298 | 5/1977 | Jones | 176/39 |
| 4,036,731 | 7/1977 | Martin | 208/8 |
| 4,045,285 | 8/1977 | Baumgaertner et al. | 176/39 |
| 4,050,897 | 9/1977 | Klein | 422/205 |
| 4,057,402 | 11/1977 | Patel et al. | 48/197 |
| 4,099,933 | 7/1978 | Johnson et al. | 48/202 |
| 4,123,502 | 10/1978 | Hölter et al. | 423/230 |
| 4,158,637 | 6/1979 | Jones | 208/449 |
| 4,191,539 | 3/1980 | Patel et al. | 48/210 |
| 4,221,654 | 9/1980 | Stein et al. | 208/15 |
| 4,234,408 | 11/1980 | Ducan | 208/408 X |
| 4,331,530 | 5/1982 | Qader | 208/10 |
| 4,346,758 | 8/1982 | Kehrer et al. | 165/134 |
| 4,406,744 | 9/1983 | Berg | 201/17 |
| 4,410,646 | 10/1983 | Romey et al. | 524/65 |
| 4,444,698 | 4/1984 | Lang et al. | 261/157 |
| 4,473,460 | 9/1984 | Küerten et al. | 208/10 |
| 4,485,003 | 11/1984 | Coenen et al. | 208/10 |
| 4,590,044 | 5/1986 | Mos et al. | 422/205 X |

FOREIGN PATENT DOCUMENTS 54994 4/1890 German Democratic Rep. ..

Primary Examiner—Andrew H. Metz
Assistant Examiner—Glenn Caldarola
Attorney, Agent, or Firm—Nils H. Ljungman

[57] ABSTRACT

A practically isothermal temperature distribution of the reactor contents is obtained, especially for high temperature and pressurized hydrogenation reactors operating in the sump-phase by a hydrogenation gas passing over the outer region of the reaction chamber, so that the hydrogenation gas cools the reaction in the chamber. Additionally, the reaction heat which is extracted by the hydrogenation gas is used to heat the reaction components at a stage in the hydrogenation process. The major portion of the reaction heat is used to heat charges, preferably for the reactors, which charges contain no appreciable amounts of solid material. These charges, preferably comprising hydrogenation gas, preferably pass through a jacket space between the reaction chambers and the external portion of the reactors, which external portions preferably make contact with the atmosphere. Only comparatively small quantities of a cold gas, mixed into the reactors for the cooling thereof, are required to establish the desired isothermal temperature distribution.

22 Claims, 3 Drawing Figures

METHOD AND APPARATUS FOR MULTIPHASE COAL HYDROGENATION REACTORS WITH EXOTHERMAL HEAT OF REACTION HAVING GAS COOLING IN SUMP-PHASE REACTORS

CROSS-REFERENCE TO CO-PENDING APPLICATIONS

Co-pending application Ser. No. 624,105, filed on June 25, 1984, entitled "Process For The Utilization Of Waste Waters In The Hydrogenation of Coal"; co-pending application Ser. No. 626,183, filed on June 29, 1984, entitled "Method For Interconnecting Thermally and Pressure-Stressed Multi-Phase Reactors"; co-pending application Ser. No. 577,311, filed on Feb. 6, 1984, entitled "Method For Preparing A Chargestock To Be Refined From A Crude Light Coal Oil"; and co-pending application Ser. No. 775,920, filed on Sept. 13, 1985, entitled "Integrated Gas-Phase Hydrogenation Process Using Heat Recovered From Sump-Phase Hydrogenation For Temperature Regulation", are all assigned to the same assignee as the instant application and are incorporated herein by reference.

BACKGROUND OF THE INVENTION

1. Field of the Invention

The invention relates to multiphase reactors with exothermal heat of reaction and, more particularly, to an arrangement for cooling the reactors.

2. Description of the Prior Art

Conventional hydrogenation reactors in the sump phase, which are operated at high temperatures and pressures, in most cases, have a ceramic lining to keep the load-bearing steel jacket at a low temperature to maintain the strength of the jacket. As a result of the temperature gradient which is established in the reactor wall, heat flows from the contents of the reactor to the environment. This waste heat represents a heat loss. However, the heat of reaction of the reactor products, for example, during coal hydrogenation, is significantly greater than the heat loss which is released through the reactor walls. Because of this, additional cold gas must be introduced into the reactor at various points to extract the excess heat of reaction from the reactants, thus establishing an approximately isothermal temperature profile of the reactor contents.

In sump-phase reactors, for example, for coal hydrogenation, the reaction heat to be extracted differs considerably along the reaction path. After the introduction of the reaction components of reaction into the reactor, the heat of reaction is initially required to heat up these reaction components. To avoid an increase above the optimal reaction temperature in the subsequent reaction phase, the excess heat of reaction must be extracted.

As a result of the decomposition of reaction products, this heat of reaction decreases as the reaction proceeds, resulting in different introductions of cold gas along the reaction path.

In spite of controlled local introductions of cold gas along the reaction path, it is not possible, however, to achieve a desired isothermal temperature profile of the reactor contents. It is known from test results in hydrogenation reactors in the sump phase that the influx of cold gas produces local zones cooled below the desired temperature. If the temperature is below the optimal reaction temperature, the chemical conversion in these zones decreases significantly. In addition, the cold gas fed in—a hydrogen-rich reaction gas, in the case of the hydrogenation of coals, tars, heavy oils, etc.—is absorbed to a lesser extent by the reactive liquid/solid phase at this low temperature, which thus has a negative influence on the chemical reaction in the sump phase.

A cold gas injected along the reaction path also has the disadvantage that it can only be used to a limited extent for chemical conversion as a reaction gas with a reduced hold time. Cold gas injection also requires a rather large gas circuit with increased compression capabilities.

As a result of the bubble column flow, the increased gas velocity decreases the density of the liquid/solid phase in the rear reactors and reduces the chemical product formation.

The comparatively large quantities of cold gas which have heretofore been customary also have a significant adverse effect on the thermal efficiency of the overall process, since the energy losses are high if cold gas is used to extract the heat of chemical reaction.

It is known, as in German Democratic Republic (DDR) Patent Specification No. 54 994, which is incorporated herein by reference, that the heat of reaction can be extracted through the reactor wall in a reactor with "floating bubbles", whereby the reaction heat is economically used to heat the charge materials in the jacket space of the reactor, and the cold gas injection described above is no longer necessary.

In this apparatus, on the pressure side of the gas compressor, a quantity of cold gas is extracted as a partial flow from the gas circuit and introduced by means of a regulating mechanism into the reactor annulus. As it flows through the annulus, this gaseous partial flow is heated to approximately the reaction temperature and, at the same time, provides for the necessary pressure equalization.

With regard to high pressure reactors with a mixture of gaseous, liquid, and solid reaction partners, the process described in German Democratic Republic Patent Specification No. 54 994 is not applicable, because of the existence of a direction connection disposed between the annulus and the inner chamber. Through this direction connection, reaction products containing solid matter can get into and plug up the annulus, either partly or completely (carbonization during hydrogenation in the sump phase), for example, there are pressure fluctuations as a result of operational disruptions. That would mean that a uniform cooling of the outer, load-bearing reactor jacket could not be assured.

With the process described above, it should be recalled that the partial flow extracted from the gas circuit must be fed through a regulating mechanism into the annulus of the reactor. This regulating mechanism, however, can represent a source of problems for the entire process.

Therefore, in another proposal, the "floating bubble" reactor principle was adapted to the requirements of the three-phase sump-phase hydrogenation, described in German Pat. No. DE 33 23 885 A 1, incorporated herein by reference. Here, however, it is not possible to achieve an isothermal temperature profile in the reactor, since the above-mentioned different heats of reaction along the reaction path cannot be extracted as desired through the reactor wall. Even with the above-mentioned German Democratic Republic (DDR) Patent Specification No. 54 994 process, the heat of reaction cannot be extracted as desired to achieve an isothermal temperature profile in the reactor.

The other common industrial method of producing an isothermal temperature profile, by means of agitators or equipment installed in the reaction chamber, cannot be used in the case of the three-phase sump-phase hydrogenation because of the dangerous formation of solid deposits on the equipment.

In industry, it is known that the principle of the loop-type bubble column reactor can be used to achieve an isothermal temperature profile in the reactor.

In this method, by means of a guide tube introduced vertically in the reactor, an intensive re-mixing of the reaction products is achieved, which causes a temperature equalization. For the extraction of the heat of reaction, the guide tube can be designed as a cooling jacket in the interior of the reactor, as in German Pat. No. DE-PS 859 444, which is incorporated herein by reference. In coal hydrogenation, however, a complete physical remixing, especially of the specific heavier reaction partner, is undesirable.

The recycling of the heavy or non-decomposable products (asphalts and pre-asphalts) in a loop-type bubble column has a negative effect on the chemical reaction which is similar to that of the external recycling of the high-asphalt sludge from the output of the last reactor to the input of the first reactor. In another process, with a loop-type bubble column and partial external recycling of products, the products with low boiling points (asphalts and pre-asphalts) are recirculated, as in German Pat. No. DE-PS 926 846, which is incorporated herein by reference. The latter two processes also have the disadvantage, as far as coal hydrogenation is concerned, that equipment installed in the reactor, for example, vertical guide tubes and an internal cooling system, especially where it presents physical flow obstructions, can frequently lead to deposits and carbonizations.

Some examples of gas cooling of other types of non-analogous reactors are found in U.S. Pat. Nos. 4,346,758, issued on Aug. 31, 1982; 4,158,637, issued on June 19, 1979; 4,045,285, issued on Aug. 30, 1977; and 4,021,298, issued on May 3, 1977, all of which are incorporated herein by reference.

Some examples of refining are provided in the following U.S. Pat. Nos. 4,485,003; 4,473,460; 4,444,698; 4,410,646; 4,406,744; 4,331,530; 4,221,654; 4,191,539; 4,123,502; 4,099,933; 4,057,402; 4,036,731; 3,953,180; 3,950,244; 3,926,775; 3,884,649; and 3,862,108. All of the aforementioned patents are incorporated herein by reference.

OBJECTS OF THE INVENTION

An object of the invention is to provide an approximately isothermal temperature profile of the contents of the reactor.

It is another object of the invention to provide approximately constant temperature profile in each reactor having multiphase charges with varying exothermal heat of reaction.

It is yet another object of the invention to provide approximately constant temperature profile in high temperature and high pressure reactors used in sump-phase hydrogenation.

It is additionally another object of the invention to utilize the gas used to cool each reactor in the hydrogenation process.

A further object of the invention is to use the extracted heat of reaction as economically as possible in the hydrogenation process.

It is a yet additional object of the invention to utilize the hydrogenation gas to cool the reactors.

SUMMARY OF THE INVENTION

The invention achieves these objects in that the major portion of the heat of reaction is extracted by means of the reactor wall, and is used to heat the charge, that is, reactor charge materials or other fluid and/or gaseous material currents from a linked system. Additionally, an approximately isothermal temperature profile of the reactor contents is achieved by means of only small injections of cold gas.

The head extraction through the reaction wall can be approximately accomplished by means of the "floating bubble" reactor principle. In this type of reactor, charges containing no solid materials, for example, hydrogenation gas in the case of coal hydrogenation, flow through the jacket space of the reactor, and are heated by the heat flux through the inner reactor wall. To achieve the above-mentioned different degrees of heat extraction along the reaction path (generally several reactors in series), the jacket spaces of the reactor are flowed through by hydrogenation gas so that the value of the operative temperature differences between the reactor contents and the hydrogenation gas corresponds to the heat of the reaction to be extracted. In addition, the flow cross section for the hydrogenation gas can be reduced in the jacket space by the installation of a baffle plate or the application of a layer of insulation (on the jacket side), to increase the heat transfer.

A controlled heat extraction along the reaction path can also be achieved with other type of reactors. On a conventional hydrogenation reactor with a lining, flow tubes or channels can be installed. In this case, the lining should comprise a material which conducts heat well.

One aspect of the invention relates broadly to a method for cooling at least one reactor in a reaction process, the method comprising the steps of: passing a substantially completely gaseous component through a passage arrangement about at least one reaction chamber of the at least one reactor, whereby a substantial portion of heat generated in the at least one reactor is transferred to the gaseous component; injecting cold gas into the at least one reactor for cooling the reaction chamber and the reactants therein; adjusting the injecting of cold gas to adjust the temperature of the reaction along and in the at least one reaction chamber within a substantially predetermined substantially constant range; thereby reducing substantially the quantity of the injected cold gas from a quantity of injected cold gas injected when the gaseous component is not passed about the at least one reaction chamber, while maintaining the substantially constant temperature range along and in the at least one reaction chamber; and recovering, in the reaction process, a substantially portion of the heat transferred to the gaseous component.

Another aspect of the invention resides in the at least one reactor comprising a plurality of serially interconnected reactors in a hydrogenation process.

Yet another aspect of the invention resides in the at least one reactor comprising at least one thermally loaded and pressurized hydrogenation reactor for the hydrogenation of at least one of the members of the group consisting essentially of coals, tars, heavy oils, and oil bearing shales.

Yet a further aspect of the invention resides in the hydrogenation comprising hydrogenation of coal.

Yet an additional further aspect of the invention resides in transferring from about fifteen percent to about twenty-five percent of the heat of reaction in the at least one reactor from its reaction components to the cold gas by the injecting of the cold gas into the at least one reactor.

A yet further aspect of the invention resides in the gaseous component being passed from one of the reactors to another of the serially interconnected plurality of reactors.

A yet additional aspect of the invention resides in adjusting the temperature of the gaseous component in accordance with a predetermined heat to be transferred from the at least one reaction chamber to heat the gaseous component to a temperature in a predetermined temperature range.

A yet further additional aspect of the invention relates to the passage apparatus comprising a space between its reaction chamber and a jacket disposed about its reaction chamber of the at least one reactor.

A subsidiary aspect of the invention relates to the at least one reactor comprising a plurality of reactors each having its passage apparatus being formed by a space between its reaction chamber and a jacket disposed about its reaction chamber.

A further subsidiary aspect of the invention relates to the space having a heat insulating layer disposed therein.

An adjunctive aspect of the invention relates to a heat insulating layer comprising baffle plates.

An adjunctive aspect of the invention relates to a heat insulating layer comprises a heat insulating material.

A further adjunctive aspect of the invention relates to a reaction chamber which is jacketed by a load-bearing wall, and wherein flow tubes are disposed within the jacket for heating the gaseous component.

A yet further adjunctive aspect of the invention relates to feeding the gaseous component, when heated, back into the reaction process and wherein the gaseous component comprises gas of hydrogenation.

A further aspect of the invention resides in a hydrogenation installation comprising a plurality of reactors; the reactors being serially connected for passing reactants from one to the other; each reactor having a reaction chamber with a jacket thereabout forming a space between the reaction chamber of each reactor and the jacket of each reactor; apparatus for inputting a gas of hydrogenation into each jacket of each reactor; apparatus for transferring heat from each reaction chamber for heating the inputted gas of hydrogenation; apparatus for outputting the gas from each jacket; apparatus for connecting the output of a first of the reactors to a second of the reactors for passing the gas of hydrogenation when heated by the first reactor to the second reactor; the second reactor having apparatus for heating the gas of hydrogenation to a greater temperature than the heat of hydrogenation was heated to in the first reactor; and apparatus for injecting cold gas into the reaction chambers of the reactors for cooling the reaction chambers and the reactants therein, whereby the temperature of reaction along and in each reaction chamber when in use is substantially within a substantially predetermined range and whereby the quantity of the injected cold gas is substantially reduced from a quantity of injected cold gas used for cooling the reactants in the reactors when the gas of hydrogenation is not inputted into the jackets of the reactors and whereby a substantial portion of the heat transferred to the heated gas of hydrogenation is recovered in the installation.

A further aspect of the invention relates to the coal hydrogenation installation and at least one of the jackets which has an annular space about the reaction chamber and wherein the apparatus for inputting the hydrogenation gas in each reactor is at the opposite end of each reactor to an input for inputting reactants for reaction in each reaction chamber.

A yet further aspect of the invention relates to at least one of the spaces having an insulating apparatus disposed therein for decreasing a transfer of heat within the space.

A yet additional further aspect of the invention relates to insulating apparatus being disposed adjacent to the jacket so that the gas of hydrogenation flows between the insulating apparatus and the reaction chamber.

A adjunctive aspect of the invention relates to insulating apparatus which comprises an insulating layer about a portion of the reaction chamber for retarding heat transfer along this portion of the reaction chamber to the gas of hydrogenation.

A further adjunctive aspect of the invention relates to one of the spaces in one of the reactors having first insulating apparatus disposed adjacent to its jacket so that the gas of hydrogenation flows between the first insulating apparatus and its reaction chamber, and a second of the spaces in a second of the reactors has an insulating layer about a portion of its corresponding reaction chamber for retarding heat transfer along this portion of its reaction chamber to the gas of hydrogenation.

DESCRIPTION OF THE PREFERRED EMBODIMENTS

Figure 1:
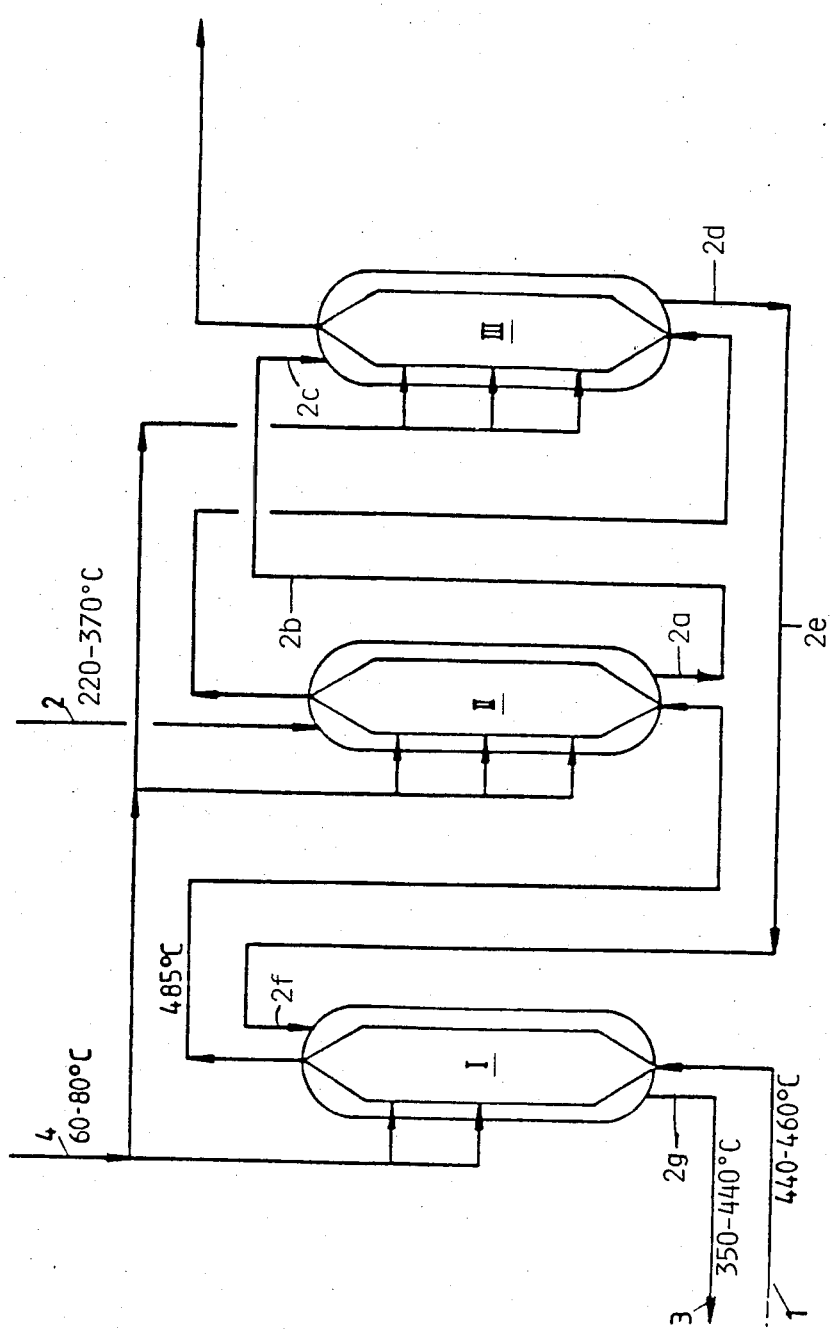
FIG. 1 is a schematic diagram of a plurality of reactors operating according to the invention.
Figure 3:
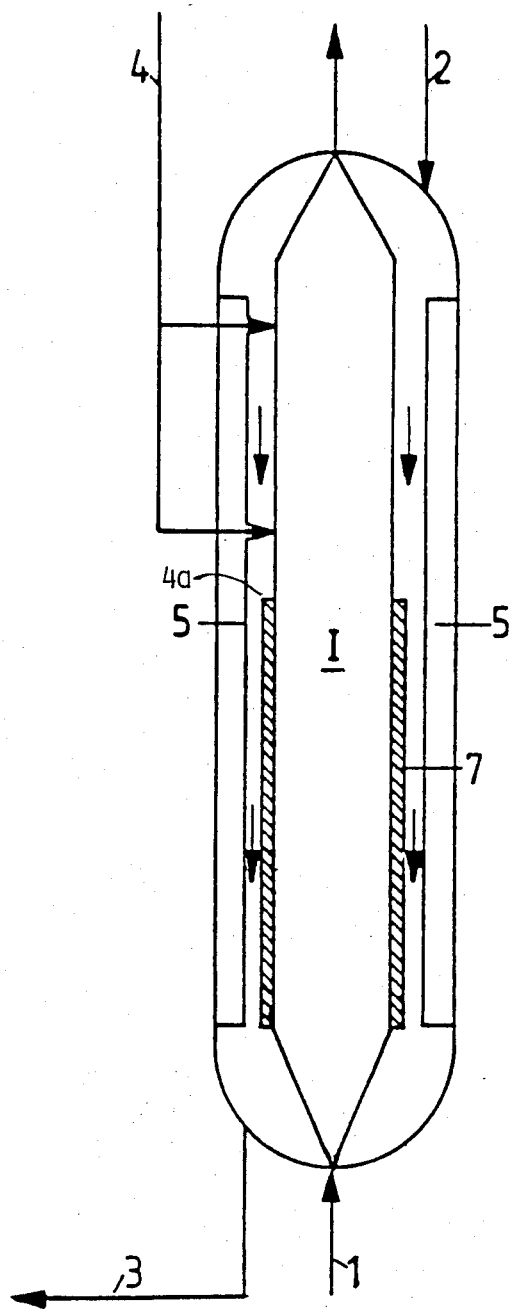
FIG. 3 is a schematic diagram of a single one of the reactors operating according to the invention.

The process is illustrated schematically in FIG. 1. An embodiment for the hydrogenation of coal is described below:

The reaction mixture, pre-heated to a temperature of 440° C.–460° C. and preferably to 460° C. and comprising 10 t/h (metric tons per hour) of coal, 0.5 t/h catalyst, 15 t/h solvent, and 9.5 t/h hydrogenation gas, flow from bottom to top through each of three reactors connected in a series. The reaction mixture is heated by the chemical heat of reaction formed in the lower portion of the first reactor Q=858 KW from 460° C. to 485° C. As a result of the insulation 7 in FIG. 3, almost no heat flows through the inner reactor wall in the lower portion of the first reactor.

Of the Q=2935 KW chemical heat of reaction formed in the following reaction path (upper portion of the first reactor, second and third reactors), 2088 KW are used by means of indirect heat exchange to heat 9.5 t/h of hydrogenation gas (entering through an inlet 2 in FIG. 1) from 220° C. to 350° C. Only comparatively little of the heat of reaction, 580 KW, is extracted for the local temperature adjustment of the contents of the reactor by means of 0.75 t/h of cold gas (4 in FIG. 1), which is heated from 60° C. to 485° C.; 290 KW flow through the walls as heat loss. In this manner, the major portion of the chemical heat of reaction is used to reheat hydrogenation gas to a comparatively high temperature.

In FIG. 1, hydrogenation gas enters the reactor II through the inlet 2 and flows about a reaction chamber thereof, thereby cooling the reaction products in the reactor II. The heated hydrogenation gas exits the reactor II at an outlet 2a, and is conducted through a conduit 2b to an inlet 2c of the reactor III, where the gas is again heated and exhausted through an outlet 2d after going through a process analogous to that in the reactor II. The gas from the outlet 2d is conducted in a conduit 2e to an inlet 2f of the reactor I, where it passes through, in a manner analogous to that of the reactors II and III. When the gas has passed through the reactor I to raise its temperature to about 350°–440° C., it is exhausted through an oulet 2 g from the reactor I, for use preferably elsewhere in the hydrogenation process.

As a result of this pre-heating of hydrogenation gas, the load on the heating system which precedes the first reactor, and which comprises of heat exchangers and heaters, can be significantly reduced.

Taking into consideration the heating of the reaction products in the lower portion of the first reactor from 460° C. to 485° C., the following flows and temperatures result for the hydrogenation gas to be preheated:

The hydrogenation gas flow is initially heated in the second reactor II from 220° C. to 282° C., and then in the third reactor III from 282° C. to 329° C., and finally in the upper portion of the first reactor I from 329° C. to 350° C. The hydrogenation gas thereby flows in the opposite way with respect to the reaction products in the reactor, that is, from the top of each reactor to the bottom thereof. Operative temperature differences are thereby established for the transfer of heat between the reactor contents and the hydrogenation gas to be heated, which tend to correspond to the heats of reaction extracted from the individual reactors.

For the precise adjustment of the temperature in the reactors, only about 0.25 t/h of cold gas is injected per reactor. The low temperature or excessively-cooled zones are thereby minimized.

Figure 2:
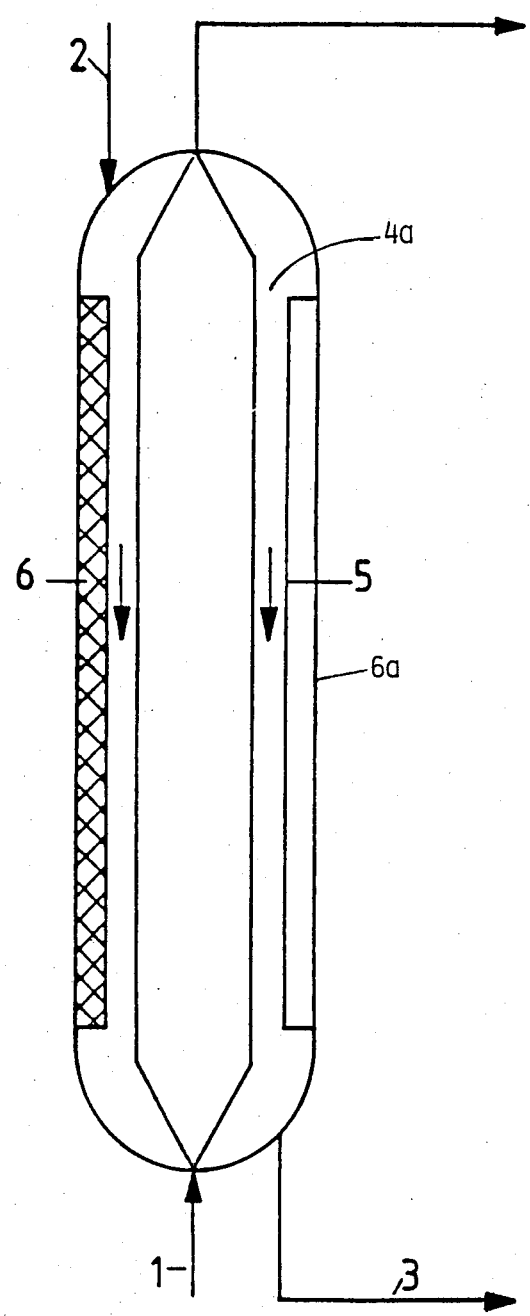
FIG. 2 is a schematic diagram of a single one of the reactors operating according to various embodiments according to the invention.

FIG. 2 shows the division of the jacket, which is preferably an annular gap, into a constricted flow channel 4a for the hydrogenation gas on the one hand, and an external insulation chamber on the other hand. The insulation chamber can be realized either by a baffle plate 5 in a first embodiment of the invention, or by means of insulation 6 in a second embodiment of the invention. The insulation chamber is on the outside of the jacket chamber 6a, so that large quantities of hydrogenation gas are heated to a high temperature. If the heat transfer coefficient in the annular gap 4a becomes too great, a comparatively thin layer of insulation, for example, asbestos sheet approximately 1 mm thick (not shown in FIG. 2), can be applied on the inside of the annular gap 4a. The external layer of insulation prevents the load-bearing, preferably steel jacket from quickly heating up to unacceptable temperatures under emergency conditions, for example, failure of the hydrogenation gas compressor, before the pressure vessel of the reactor can be depressurized. The various parts of the reactors are preferably made from some ferrous material such as steel.

In the reactor I, a comparatively large amount of heat of reaction must be extracted, while in the lower portion of the reactor I, little cooling should take place. For this purpose, the embodiment of the jacket space illustrated in FIG. 3 can be used. In the upper portion of the reactor I, the flow channel in the jacket space 4a is constricted by means of a baffle plate 5, to improve the heat transfer by an increased flow velocity. In the lower portion of the reactor I, the heat extraction is greatly reduced as a result of an internal insulation layer 7.

The invention as described hereinabove in the context of the preferred embodiments is not to be taken as limited to all of the provided details thereof, since modifications and variations thereof may be made without departing from the spirit and scope of the invention.

What is claimed is:

1. Method for cooling at least one reactor in a reaction process, said at least one reactor being a thermally loaded and pressurized coal product hydrogenation reactor operating in the sump phase, said method comprising the steps of:
   introducing a multiphase reactant mixture into at least one reaction chamber of said at least one reactor, said multiphase reactant mixture including at least two phases chosen from the group consisting of solid, liquid and gas;
   passing a substantially completely gaseous component through passage means about said at least one reaction chamber of said at least one reactor, whereby a substantial portion of heat generated in said at least one reactor is transferred to said gaseous component;
   injecting cold gas into said at least one reactor for cooling said reaction chamber and the reactants therein;
   adjusting said injecting of cold gas to adjust the temperature of the reaction along and in said at least one reaction chamber within a substantially constant range, thereby reducing substantially the quantity of said injected cold gas from a quantity of injected cold gas injected when said gaseous component is not passed about said at least one reaction chamber, while maintaining said substantially constant temperature range along and in said at least one reaction chamber; and
   recovering, in said reaction process, a substantial portion of the heat transferred to said gaseous component.

2. The method for cooling at least one reactor in a reaction process according to claim 1, further comprising a plurality of serially interconnected reactors in a hydrogenation process, said at least one reactor comprising one of said plurality of reactors.

3. The method for cooling at least one reactor in a reaction process according to claim 2, wherein said at least one reactor comprises at least one thermally loaded and pressurized hydrogenation reactor for the hydrogenation of at least one of the members of the group consisting of coals, tars, heavy oils, and oil bearing shales.

4. The method for cooling at least one reactor in a reaction process according to claim 3 wherein said hydrogenation comprises hydrogenation of coal.

5. The method for cooling at least one reactor in a reaction process according to claim 1, including transferring from about fifteen percent to about twenty-five percent of the heat of reaction in said at least one reactor from its reaction components to said cold gas by said injecting of said cold gas into said at least one reactor.

6. The method for cooling at least one reactor in a reaction process according to claim 2, wherein said gaseous component is passed from one of said reactors to another of said serially interconnected plurality of reactors.

7. The method for cooling at least one reactor in a reaction process according to claim 1, including adjusting the temperature of said gaseous component in accordance with a predetermined heat to be transferred from said at least one reaction chamber to heat said gaseous component to a temperature in a predetermined temperature range.

8. The method for cooling at least one reactor in a reaction process according to claim 1, wherein said passage means comprises a space between its reaction chamber and a jacket disposed about its reaction chamber of said at least one reactor.

9. The method for cooling at least one reactor in a reaction process according to claim 8, further comprising a plurality of reactors each having its passage means being formed by a space between its reaction chamber and a jacket disposed about its reaction chamber.

10. The method for cooling at least one reactor in a reaction process according to claim 8, wherein said space has a heat insulating layer disposed therein.

11. The method for cooling at least one reactor in a reaction process according to claim 9, wherein each space has a heat insulating layer disposed therein.

12. The method for cooling at least one reactor in a reaction process according to claim 10, wherein said heat insulating layer comprises baffle plates.

13. The method for cooling at least one reactor in a reaction process according to claim 10, wherein said heat insulating layer comprises a heat insulating material.

14. The method for cooling at least one reactor in a reaction process according to claim 1, wherein said reaction chamber is jacketed by a load-bearing wall, and wherein flow tubes are disposed within said jacket for heating said gaseous component.

15. The method for cooling at least one reactor in a reaction process according to claim 1, including feeding said gaseous component, when heated, back into said reaction process and wherein said gaseous component comprises gas of hydrogenation.

16. The method for cooling at least one reactor in a reaction process according to claim 3, including feeding said gaseous component, when heated, back into said reaction process and wherein said gaseous component comprises gas of hydrogenation.

17. A hydrogenation installation comprising a plurality of thermally loaded and pressurized coal product hydrogenation reactors operating in the sump phase; said reactors being serially connected for passing multiphase reactants from one to the other, said multiphase reactants including at least two phases chosen from the group consisting of solid, liquid and gas;
each said reactor having a reaction chamber with a jacket thereabout forming a space between said reaction chamber of each said reactor and said jacket of each said reactor;
means for inputting a gas of hydrogenation into each said jacket of each said reactor;
means for transferring heat from each said reaction chamber for heating said inputted gas of hydrogenation;
means for outputting said gas from each said jacket;
means for connecting the output of a first of said reactors to a second of said reactors for passing the gas of hydrogenation when heated by said first reactor to said second reactor;
said second reactor having means for heating said gas of hydrogenation to a greater temperature than said heat of hydrogenation was heated to in said first reactor; and
means for injecting cold gas into said reaction chambers of said reactors for cooling said reaction chambers and said reactants therein,
whereby the temperature of reaction along and in each said reaction chamber when in use is substantially within a substantially constant range and whereby the quantity of said injected cold gas is substantially reduced from a quantity of injected cold gas used for cooling said reactants in said reactors when said gas of hydrogenation is not inputted into the jackets of the reactors and whereby a substantial portion of the heat transferred to said heated gas of hydrogenation is recovered in said installation.

18. The hydrogenation installation according to claim 17, wherein said installation is a coal hydrogenation installation and at least one of said jackets has an annular space about said reaction chamber and wherein said means for inputting said hydrogenation gas in each said reactor is at the opposite end of each reactor to an input for inputting reactants for reaction in each said reaction chamber.

19. The hydrogenation installation according to claim 18, wherein at least one of said spaces has an insulating means disposed therein for decreasing a transfer of heat within said space.

20. The hydrogenation installation according to claim 19, wherein said insulating means is disposed adjacent to said jacket so that said gas of hydrogenation flows between said insulating means and said reaction chamber.

21. The hydrogenation installation according to claim 19, wherein said insulating means comprises an insulating layer about a portion of said reaction chamber for retarding heat transfer along this portion of said reaction chamber to said gas of hydrogenation.

22. The hydrogenation installation according to claim 19 wherein one of said spaces in one of said reactors has first insulating means disposed adjacent to its jacket so that said gas of hydrogenation flows between said first insulating means and its reaction chamber, and a second of said spaces in a second of said reactors has an insulating layer about a portion of its corresponding reaction chamber for retarding heat transfer along this portion of its reaction chamber to said gas of hydrogenation.

* * * * *